E. A. IVATTS.
APPARATUS FOR SUSPENDING FILMS AND THE LIKE.
APPLICATION FILED DEC. 13, 1910.
1,001,957.
Patented Aug. 29, 1911.
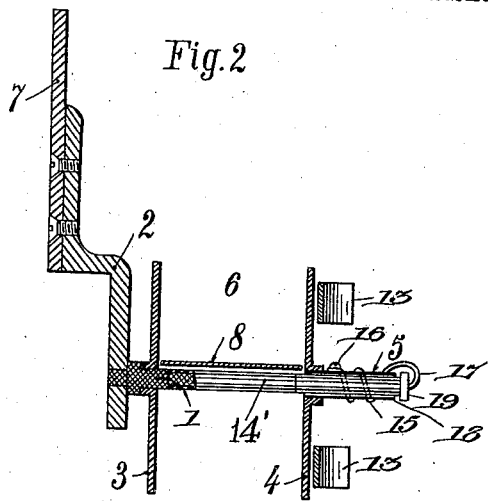
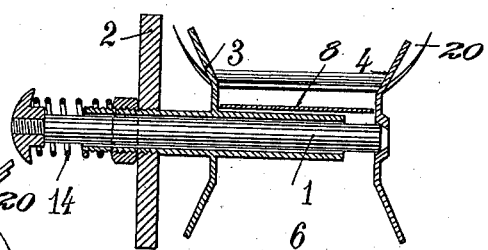
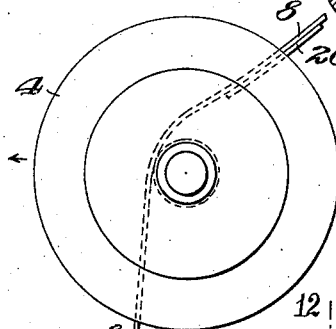
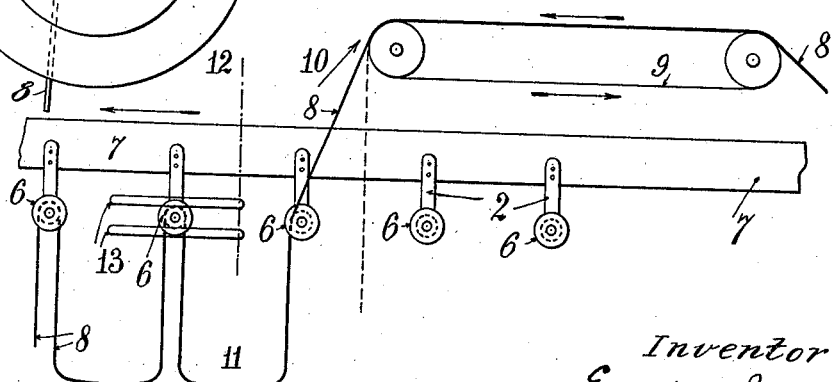
Witnesses
Inventor
Ernest A. Ivatts
by
Rosenbaum & Stockbridge
attys

UNITED STATES PATENT OFFICE.

ERNEST ALBERT IVATTS, OF PARIS, FRANCE, ASSIGNOR TO SOCIETY COMPAGNIE GENERALE DE PHONOGRAPHES, CINEMATOGRAPHES ET APPAREILS DE PRECISION, OF PARIS, FRANCE.

APPARATUS FOR SUSPENDING FILMS AND THE LIKE.

1,001,957.      Specification of Letters Patent.     Patented Aug. 29, 1911.

Application filed December 13, 1910. Serial No. 597,065.

*To all whom it may concern:*

Be it known that I, ERNEST ALBERT IVATTS, citizen of Great Britain, residing at Paris, in the Department of the Seine, France, have invented certain new and useful Improvements in Apparatus for Suspending Films and the Like, of which the following is a specification.

This invention refers to the suspension of films, perforated or not, and is applicable to film drying devices of the transporting and other types, and more particularly to the continuous drying device forming the subject matter of the American patent granted on the 8th February 1910—No. 948,731, in which the suspending devices are fitted to a belt moving in a closed circuit in a drying chamber.

According to the present invention the suspension is effected by a device working on the following principle: If a film is wedged by its edges when it is in a rectilineal position, it immediately gives and curves according to a cylindrical surface, the rectilineal generating lines of which are parallel to the edges of the film. Thus deformed the film cannot be made to roll around an axis perpendicular to its borders without creasing the film; but on the contrary if the film is first wound around an axis perpendicular to its borders even only on a fraction of circumference, it is then possible to wedge or clamp the borders of the film at the spot where it is wound around, without creasing it and with sufficient force to provoke a friction compensating for example the weight of the descending loop and for stopping the film as soon as the loop has reached the desired length.

The suspension device based on the above mentioned principle is characterized by special arrangements and by the mechanism supporting the loops and fastened to the transporter. This device is employed in conjunction with other arrangements or parts forming the complete drying system which for example may be composed as follows:

1. A device for moving along the films to be dried and bringing the latter continually above the suspending mechanism and formed for example of an endless belt driven at a definite speed by means of suitable transmission.

2. A horizontal endless transporter for supporting the loops formed by the film to be dried and describing an open or closed circuit the length as well as the speed of which is calculated so that the film shall be dried slightly before reaching the end of the circuit.

3. A suspending mechanism formed by a transporting system like an endless belt and driven by a transmission at speeds adjustable as desired so that the release of the film is effected automatically at the desired spot corresponding to the arrival of the loops carried along by the transporter which is situated on the ceiling of a suitable drying chamber adapted to the method of drying to be effected. On leaving this drying chamber and on being disengaged from the suspension mechanism the film is wound automatically or not on to a spool by any known means, for example by a friction winder.

I shall now describe my invention with reference to the accompanying drawings in which:

Figure 1 diagrammatically shows the drying device comprising the suspension systems. Fig. 2 is a sectional view of the suspension device. Fig. 3 is a sectional view of a modification of the suspension device. Fig. 4 is a detail of said modification, showing the disposition of the disk separator thereof with respect to the rollers.

Referring to the drawings the suspension supports are essentially formed by rollers composed of a horizontal rod 1 mounted on any support 2 fastened to the transporter. On this rod are mounted perpendicularly to the axis of the rod two disks 3 and 4 the distance of which from each other can be varied. In order to facilitate the construction, one of the disks, 3 for example, is rigidly mounted on the rod 1, whereas the other is mounted on a tube 5 which can slide on the rod 1, the whole arrangement forming a kind of roller 6 with large flanges, one of which is transversely movable. These rollers 6 are provided at equal intervals on the transporter 7 of open or closed circuit, the film 8 is brought to the endless belt 9 by any suitable means. On reaching the point 10 the film is detached by reason of its own weight and descends almost vertically above the path of the rollers 6 which one after the other carry it along in the direction in which they move. During a portion of the course, the film occupying the position shown in Fig. 2 slides on the throat formed by the rod 1 of the rollers 6 rotated by the weight of the loop in formation until the rollers reach the fastening point 12. At this spot any suitable mechanism, as for example fixed spring blades 13 act on the movable roller so as to draw together the flanges 3 and 4 and thus wedge the film 8 as shown in Fig. 2. Thus wedged this film in accordance with the above mentioned principle being wound according to a certain arc on the roller resists the pressure which is exerted laterally so that the friction of the borders of the film 8 on the flanges 3 and 4 of the roller 6 stops the descending movement. At this moment the film continually fed by the belt 9 no longer being drawn along in front by the weight of the loop falls back by its own weight behind this roller so as to be caught by the following roller.

The action of the spring 13 on the movable flange 4 of the roller 6 is only momentary and ceases when the loop being formed has acquired a sufficient determined length so as not to be drawn along by the weight of the loop previously formed. In order to avoid the slipping of the loops which might be occasioned by any irregularity in their length or by any difference in the weight of the film of one loop as compared with the other, or by the vibrations of the transporter, a band of india rubber or other material 14′ increasing the adherence may be provided on the throat of the roller. The rollers may also be provided with springs 15 automatically returning the flanges to their normal positions after having passed by the suspension spring. Springs 15 may be of any suitable construction and I have shown in Fig. 2 a simple helical spring disposed around the tube 5 and secured thereto at one end by a set screw 16. The other end of the helix is bent around as at 17 to clear the stop-forming head 18 at the extremity of the rod 1, and is preferably pointed as at 19, which point is seated in a small centrally disposed recess in the head 18. It is evident that on the same principle other mechanical arrangements might be thought of for effecting a similar purpose. For example as shown in Fig. 3, a spring 14 may be provided on each roller the action of which is always to tend to draw the flanges 3 and 4 together, the suspension device being formed by a fixed incline 20 serving to move the flanges away from each other so as to cause the film 8 to pass to the bottom of the rollers and which suddenly ceasing at the suspension spot permits the flanges suddenly approaching together under the action of the spring thereby occasioning the wedging and consequently the stoppage of the film 8.

It is evident that modifications may be introduced in the suspension system described without in any way affecting the principle of the present invention. Furthermore this same method of suspension by wedging may be utilized for suspending any objects in the form of sheets, bands or the like whether for drying or for any other purpose.

Having now particularly described and ascertained the nature of my said invention, I declare that what I claim is:

1. In apparatus for carrying film strips and the like, a support, a plurality of spaced carrying appliances thereon adapted to support a strip of flexible material, said appliances comprising separable members adapted to engage the edges of said strip, and means for separating said members.

2. In apparatus for carrying film strips and the like, a support, a plurality of spaced carrying appliances thereon adapted to support a strip of flexible material, said appliances comprising separable members adapted to engage the edges of said strip, and means for driving said separable members into engagement with the edges of said strip.

3. In an apparatus for carrying film strips and the like, a support, a plurality of spaced carrying appliances thereon adapted to support a strip of flexible material, said appliances comprising separable members adapted to yieldingly engage the edges of said strip, and means for separating said members.

4. In apparatus for carrying film strips and the like, a support, a plurality of spaced carrying appliances thereon adapted to support a strip of flexible material, said appliances comprising separable members adapted to engage the edges of said strip, and resilient means for driving said separable members into engagement with the edges of said strip.

5. In apparatus for carrying film strips and the like, a movable support, a plurality of spaced rollers thereon adapted to support a strip of flexible material, said rollers comprising side plates relatively movable with respect to each other and adapted to engage the edges of said strip, and means for yieldingly clamping said strip between said plates.

6. In apparatus for carrying film strips and the like, a movable support, a plurality of spaced rollers thereon adapted to support a strip of flexible material, said rollers comprising side plates relatively movable with respect to each other and adapted to engage the edges of said strip, and means for clamping said strip between said plates.

7. In apparatus for carrying film strips and the like, a plurality of spaced carrying appliances adapted to be moved at a determined speed, a conveying device adapted to deliver to said appliances a strip of film or the like at a greater rate of speed than that of said appliances, whereby loops are formed in the strip, said appliances comprising means for grasping said strip at its edges to aid in forming said loops, and means for actuating said grasping means.

In testimony whereof I affix my signature in presence of two witnesses.

ERNEST ALBERT IVATTS.

Witnesses:
HENRY DANTIZ,
LUCIEN CRESPIN.

Copies of this patent may be obtained for five cents each, by addressing the "Commissioner of Patents, Washington, D. C."